W. L. SPROWL.
SEED PLANTER AND MARKER.
APPLICATION FILED MAR. 22, 1921.
1,407,097.
Patented Feb. 21, 1922.
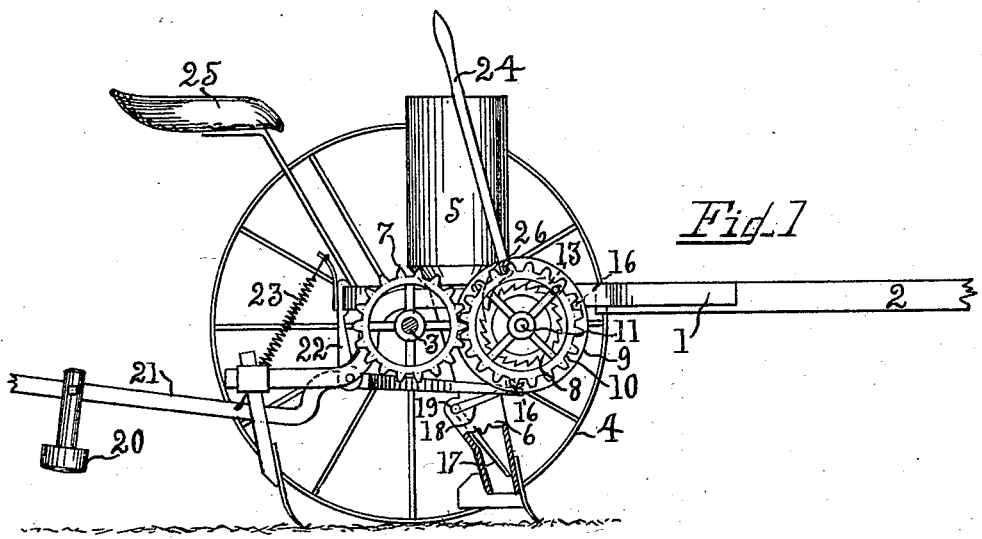
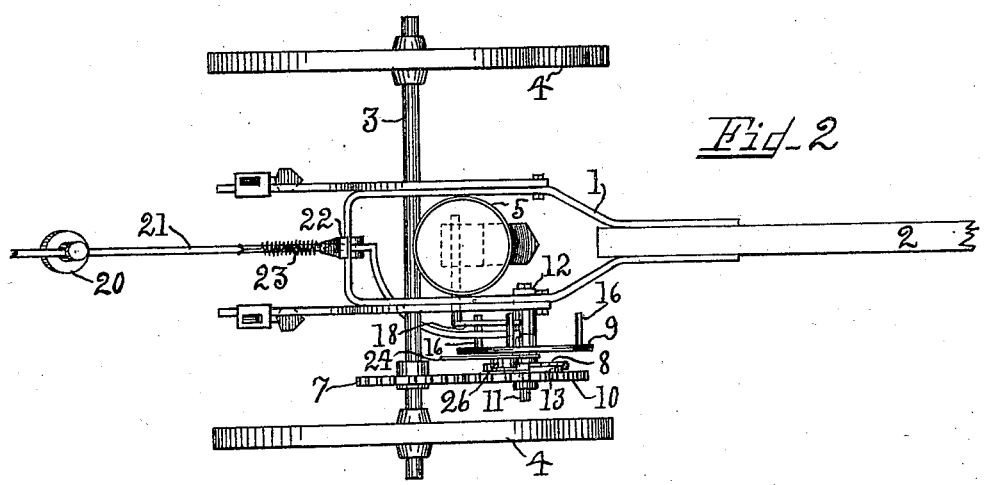
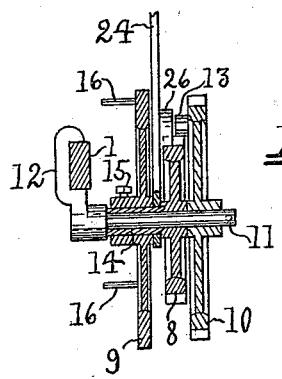
Inventor.
Wm L. Sprowl.
By J. P. Dederick.
Attorney.

UNITED STATES PATENT OFFICE.

WILLIAM L. SPROWL, OF SHERMAN, TEXAS.

SEED PLANTER AND MARKER.

1,407,097.  Specification of Letters Patent.  Patented Feb. 21, 1922.

Application filed March 22, 1921. Serial No. 454,579.

*To all whom it may concern:*

Be it known that I, WILLIAM L. SPROWL, a citizen of the United States, residing at Sherman, in the county of Grayson and State of Texas, have invented certain new and useful Improvements in Seed Planters and Markers, of which the following is a specification.

This invention relates to seed planting and marking machines designed for planting corn or cotton, but capable also of use for depositing any seeds to be planted in rows.

My invention has further relation to improved means for planting seed in check-rows without requiring the use of the usual check cord or line stretched across the field to operate the dropping mechanism at regular intervals.

A further object of the invention is to provide means for regulating the operation of the seed-dropping mechanism to discharge seed at variable intervals for the purpose of planting the seed at different distances, and for marking the hills.

A further object of the invention is the provision of a novel seed-dropping mechanism by which the seed, as usually dropped from the hopper into the seed chute pass only to a discharging valve in the chute, which, at regular intervals, or as manually controlled, drop them directly behind the furrow opening shovel.

The invention also embodies various subordinate features of construction and combinations of parts, all subservient to the broad features above outlined which will be more fully described hereinafter, shown in the accompanying drawings and particularly pointed out in the appended claim; it being understood that changes in the form, proportion, size and minor details of construction may be resorted to within the scope of the claim without departing from the spirit or sacrificing any of the advantages of the present invention.

In the accompanying drawings, Figure 1 is a side elevation of my improved seed planter and marking machine, with the near wheel removed. Fig. 2 is a plan view of the same. Fig. 3 is an enlarged detail sectional view of the mechanism for operating the seed dropping valve and the hill marker.

Corresponding and like parts are referred to in the following description and indicated in the several views of the accompanying drawings by the same reference characters.

The numeral 1 indicates the frame, 2 the tongue, 3 the axle, 4 the ground-wheels, one of which is secured upon its spindle, and 5 the hopper of an ordinary planter. A seed chute 6 depends from the frame under the hopper and the seed is delivered to the chute in the usual manner. In applying my device, a gear wheel 7 is secured to the axle 4 in any suitable manner, and is designed to impart motion to the ratchet 8 and disk wheel 9, through the gear wheel 10. The gear 10, ratchet, and disk are free to rotate on a spindle 11 secured at 12, to the frame 1. The gear 10 carries a pawl 13 that engage teeth in the ratchet 8, and a hub 14 extends from the ratchet through the disk, to which it is secured by set-screw 15. The disk is provided with a plurality of apertures in which are laterally projecting tripping pins 16, all of which are equally spaced peripherally on its side. The number of these pins 16 will control the distance apart of the hills of seed, the less the number the greater the distance apart of the hills, and the greater the number of pins the less the distance apart of the hills, because the valve 17 in the chute 6 will be operated a greater number of times during one revolution of the axle. If the circumference of the ground-wheels is nine feet, and three pins be used and equally spaced, the gearing is proportioned to drop hills three feet four inches apart, and if the number of pins is six the hills will be twenty inches apart. It will thus be seen that by varying the number of the pins, the seeds may be planted at any required distance apart. An L-shaped tripping lever 18 is pivoted at 19 to the chute 6 and is connected with a valve 17 disposed in the chute. The valve 17 lies across the chute at an incline, and is thus held by a spring arranged in any suitable manner. It is obvious that when the outer end of the lever 18, which projects into the path of the pins is depressed, the valve 17 is opened, and the seed which is previously lodged against said valve is thus permitted to drop.

To mark the hills and enable the planting of the hills in the new rows in perfect line with the hills in the last rows, a marker 20, adjustable on a lever 21 is provided; the lever is pivoted intermediately on a bracket 22 depending from the frame 1, from which bracket one end projects horizontally into the path of the pins 16, and whereby the marker is raised and dropped simultaneously with the opening and closing of the valve 17, marking the hill previously dropped, which marking enables the operator to detect any variation in the alinement of the hills. A coiled spring 23 adds resiliency to the flexible connection of the lever 21 and affords a quick rebound of the marker after a hill is tamped.

When necessary to correct any variation in the alinement of the hills, it is accomplished by means of a lever 24, which is mounted adjacent to the driver's seat 25, on the hub of the ratchet. A pawl 26 is pivoted to the lever and engages the teeth of the ratchet 8, which permits of turning the ratchet and disk as may be necessary to vary their operative connection with the valve and marker.

When the end of a row is reached, and the planter is turned back on the next row it is necessary to adjust the disk 9 so that the pins 16 will trip the valve and marker at the proper point to aline with the hills of the preceding rows. This is quickly accomplished by operating the lever 24 and rotating the ratchet 8, which in turn rotates the disk with pins to the proper space.

Having now set forth the object and nature of my invention and a form of embodiment of the same, and having described the construction, function, and mode of operation thereof, what I claim as new and desire to secure by Letters Patent, is—

In a device of the class described, comprising a frame, a rotatable axle therein, ground wheels mounted on said axle one of which is secured thereto, a hopper and a seed chute mounted on the frame, a valve inclined in said chute and a lever connected with the valve, a hill marker mounted on a horizontally disposed lever carried by the frame, and mechanism for actuating both levers comprising a gear secured to the axle, a spindle carried by the frame having a gear, a ratchet-wheel and a disk wheel rotatable thereon, the former in engagement with the axle gear, a pawl on the spindle carried gear adapted to engage the teeth of the ratchet, a hub integral with the ratchet to which the disk is secured, and a plurality of equally spaced pins extending laterally from the face of the disk whereby the levers are operated with the forward movement of the machine, substantially as set forth.

In testimony whereof I affix my signature.

WILLIAM L. SPROWL.